US00RE50592E

(19) United States
(12) Reissued Patent
Leys et al.

(10) Patent Number: US RE50,592 E
(45) **Date of Reissued Patent: *Sep. 23, 2025**

(54) DRAPER SEAL FOR CROP HEADER

(71) Applicant: HONEY BEE MANUFACTURING LTD., Frontier (CA)

(72) Inventors: Darren Leys, Frontier (CA); Barry Lindmark, Frontier (CA)

(73) Assignee: HONEY BEE MANUFACTURING LTD., Frontier (CA)

( * ) Notice: This patent is subject to a terminal disclaimer.

(21) Appl. No.: 17/853,795

(22) Filed: Jun. 29, 2022

Related U.S. Patent Documents

Reissue of:
(64) Patent No.: 10,694,675
Issued: Jun. 30, 2020
Appl. No.: 16/410,174
Filed: May 13, 2019

U.S. Applications:
(63) Continuation of application No. 15/453,161, filed on Mar. 8, 2017, now Pat. No. 10,285,331, which is a
(Continued)

(30) Foreign Application Priority Data

Dec. 18, 2012 (CA) ..... CA 2799093

(51) Int. Cl.
*A01D 61/02* (2006.01)
*A01D 34/04* (2006.01)
(Continued)

(52) U.S. Cl.
CPC ..... *A01D 61/02* (2013.01); *A01D 34/04* (2013.01); *A01D 34/14* (2013.01); *A01D 34/40* (2013.01);
(Continued)

(58) Field of Classification Search
CPC ..... A01D 61/02; A01D 34/04; A01D 34/14; A01D 34/145; A01D 34/40; A01D 41/14;
(Continued)

(56) References Cited

U.S. PATENT DOCUMENTS 12,750 A 4/1855 Chatfield
524,215 A 8/1894 Quigley
(Continued)

FOREIGN PATENT DOCUMENTS

CA 1003310 1/1977
CA 1040438 10/1978
(Continued)

OTHER PUBLICATIONS

Merriam-Webster: "canvas" https://www.merriam-webster.com/dictionary/canvas last updated Jul. 14, 2024.*
(Continued)

*Primary Examiner* — William V Gilbert

(57) ABSTRACT

A header includes a forwardly disposed cutter bar assembly and a rearwardly disposed draper deck assembly. The draper seal includes a flexible strip that runs parallel to the cutter bar assembly and perpendicular to the direction of travel. A bracket secures the forward edge of the flexible strip to an upper surface of the cutter bar assembly, which bracket also biases a rearward edge of the flexible strip into engagement with an upper surface of the draper deck assembly, thereby creating a seal between the cutter bar assembly and the draper deck assembly.

27 Claims, 1 Drawing Sheet

Related U.S. Application Data continuation of application No. 13/766,800, filed on Feb. 14, 2013, now Pat. No. 9,635,810.

(51) Int. Cl.

| | |
|---|---|
| ***A01D 34/14*** | (2006.01) |
| ***A01D 34/40*** | (2006.01) |
| ***A01D 41/14*** | (2006.01) |
| ***A01D 61/00*** | (2006.01) |
| *A01D 101/00* | (2006.01) |

(52) U.S. Cl.

CPC ..... *A01D 41/14* (2013.01); *A01D 61/002* (2013.01); *A01D 2101/00* (2013.01)

(58) Field of Classification Search

CPC .. A01D 61/002; A01D 61/004; A01D 61/006; A01D 2101/00

See application file for complete search history.

(56) References Cited

U.S. PATENT DOCUMENTS 855,519 A 6/1907 Maloney
1,422,002 A 7/1922 Shaw
1,862,101 A * 6/1932 Pax ..... A01D 61/002 198/523
1,917,604 A * 7/1933 Scranton, Jr. ..... A01D 34/13 56/298
2,235,602 A * 3/1941 Biesemeyer ..... A01D 61/002 56/181
2,237,517 A 4/1941 Anderson
2,347,365 A * 4/1944 Paradise ..... A01D 57/20 198/699
2,413,072 A 12/1946 Sage
2,599,438 A 6/1952 Downing et al.
2,681,134 A 6/1954 White, Jr.
2,685,958 A * 8/1954 White, Jr. ..... E02F 7/00 198/836.1
2,687,209 A 8/1954 Rost et al.
2,694,894 A 11/1954 Linscheld
2,720,743 A * 10/1955 Prather ..... A01D 61/008 56/207
2,795,922 A * 6/1957 Hume ..... A01D 41/14 56/257
3,169,633 A 2/1965 Baker
3,344,909 A * 10/1967 Hansen ..... B25G 21/2081 198/836.1
3,468,109 A 9/1969 Reimer
3,472,008 A 10/1969 Hurlburt
3,550,366 A 12/1970 Gibson
3,771,299 A 11/1973 Gradwohl et al.
3,866,400 A * 2/1975 May ..... A01D 57/26 56/158
3,927,512 A 12/1975 Molzahn
3,945,180 A 3/1976 Sinclair
4,038,810 A 8/1977 Williams et al.
4,067,177 A 1/1978 Tout
4,120,137 A 10/1978 Schoenberger et al.
4,127,981 A 12/1978 Parrish et al.
4,137,696 A 2/1979 Webb
4,156,340 A 5/1979 Colgan et al.
4,174,602 A 11/1979 Webb et al.
4,177,625 A 12/1979 Knight et al.
4,187,664 A 2/1980 Meek et al.
4,198,803 A * 4/1980 Quick ..... A01D 34/13 56/296
4,199,925 A * 4/1980 Quick ..... A01D 41/14 56/208
4,202,154 A 5/1980 Waldrop et al.
4,270,338 A 6/1981 Halls
4,346,909 A 8/1982 Hundeby
4,353,201 A 10/1982 Pierce et al.
4,435,948 A 3/1984 Jennings
4,441,307 A * 4/1984 Enzmann ..... A01D 41/14 56/10.2 R
4,512,140 A 4/1985 Blakeslee
4,519,190 A 5/1985 Blakeslee
4,522,018 A 6/1985 Blakeslee
4,541,229 A 9/1985 Elijah
4,573,124 A 2/1986 Seiferling
4,573,309 A 3/1986 Patterson
4,612,757 A 9/1986 Halls et al.
4,637,201 A 1/1987 Pruitt et al.
4,641,490 A 2/1987 Wynn et al.
4,660,361 A 4/1987 Remillard et al.
4,662,161 A 5/1987 Patterson
4,722,172 A * 2/1988 Pearce ..... A01D 34/13 56/14.4
4,751,809 A 6/1988 Fox et al.
4,776,155 A 10/1988 Fox et al.
4,833,869 A 5/1989 Klein
4,909,026 A 3/1990 Molzahn et al.
4,936,082 A 6/1990 Majkrzak
4,944,141 A 7/1990 Orlando et al.
4,956,966 A 9/1990 Patterson
5,005,343 A 4/1991 Patterson
5,007,235 A 4/1991 Nickel et al.
5,086,613 A 2/1992 Fox et al.
5,155,983 A 10/1992 Sheehan et al.
5,157,905 A 10/1992 Talbot et al.
5,219,064 A * 6/1993 Roman ..... B03B 9/06 198/823
5,243,810 A 9/1993 Fox et al.
5,261,290 A 11/1993 Ramsay et al.
5,359,839 A 11/1994 Parsons et al.
5,435,239 A 7/1995 Talbot
5,459,986 A * 10/1995 Talbot ..... A01D 61/002 56/14.5
5,473,872 A 12/1995 Fox et al.
5,535,577 A 7/1996 Chmielewski et al.
5,595,053 A 1/1997 Jasper et al.
RE35,543 E 7/1997 Patterson
5,678,398 A 10/1997 Fox et al.
5,681,117 A 10/1997 Wellman et al.
5,704,200 A 1/1998 Chmielewski, Jr. et al.
5,768,870 A 6/1998 Talbot et al.
5,791,128 A 8/1998 Rogalsky
5,927,606 A 7/1999 Patterson
5,992,759 A 11/1999 Patterson
6,029,429 A 2/2000 Fox et al.
6,044,636 A 4/2000 Minnaert
6,079,194 A 6/2000 Waldrop
6,170,244 B1 1/2001 Coers et al.
6,195,972 B1 3/2001 Talbot et al.
6,199,358 B1 3/2001 Majkrzak
6,282,876 B1 9/2001 Patterson
6,324,823 B1 12/2001 Remillard
6,351,931 B1 * 3/2002 Shearer ..... A01D 57/20 56/14.5
6,397,573 B2 6/2002 Majkrzak
6,442,918 B1 9/2002 Fox
6,453,655 B2 9/2002 Ferraris
6,502,379 B1 1/2003 Snider
6,519,923 B1 2/2003 Cooksey et al.
6,530,202 B1 3/2003 Guyer
6,543,211 B1 4/2003 Talbot
6,591,598 B2 7/2003 Remillard et al.
6,675,568 B2 1/2004 Patterson et al.
6,698,175 B1 3/2004 Schumacher et al.
6,708,475 B2 3/2004 Guyer
6,817,166 B2 11/2004 Dunn
6,843,045 B2 1/2005 Bickel
6,854,251 B2 2/2005 Snider
6,865,871 B2 3/2005 Patterson et al.
6,889,492 B1 5/2005 Polk et al.
6,962,040 B2 11/2005 Talbot
7,077,220 B2 7/2006 Dunn et al.
7,131,253 B2 11/2006 Remillard et al.
7,159,687 B2 1/2007 Dunn et al.
7,188,461 B2 3/2007 Fox et al.
7,197,865 B1 4/2007 Enns et al.
7,306,062 B2 12/2007 Dunn

(56) References Cited

U.S. PATENT DOCUMENTS 7,306,252 B2 12/2007 Barnett
7,308,947 B2 12/2007 Barnett
7,322,175 B2 1/2008 Ferre et al.
7,328,565 B2 2/2008 Snider et al.
7,340,876 B1 3/2008 Barnett
7,347,277 B2 3/2008 Enns et al.
7,356,982 B2 4/2008 Barnett
7,364,181 B2 4/2008 Patterson
7,373,769 B2 5/2008 Talbot et al.
7,392,124 B2 6/2008 MacGregor et al.
7,392,646 B2 7/2008 Patterson
7,412,816 B2 8/2008 Coers et al.
7,438,305 B2 10/2008 Schulz
7,444,798 B2 11/2008 Patterson et al.
7,454,888 B2 11/2008 Barnett
7,461,498 B1 12/2008 Barnett
7,467,505 B2 12/2008 MacGregor
7,467,506 B2 12/2008 Lovett et al.
7,472,533 B2 1/2009 Talbot et al.
7,478,521 B2 1/2009 Coers et al.
7,484,349 B2 2/2009 Talbot et al.
7,497,069 B2 3/2009 Enns et al.
7,549,280 B2 * 6/2009 Lovett et al. ..... A01D 57/20 56/208
7,591,127 B1 * 9/2009 Stacer ..... A01D 65/00 56/12.9
7,600,364 B2 10/2009 Lovett et al.
7,640,720 B1 1/2010 Lovett et al.
7,647,755 B2 1/2010 Barnett et al.
7,721,830 B2 5/2010 Dunn et al.
7,730,707 B2 6/2010 Pietricola et al.
7,849,952 B2 12/2010 MacGregor et al.
7,856,801 B2 12/2010 Remillard
7,886,511 B2 * 2/2011 Honas ..... A01D 57/20 56/181
7,908,836 B1 3/2011 Rayfield et al.
7,918,076 B2 4/2011 Talbot
7,937,920 B2 5/2011 Schmidt et al.
7,958,706 B2 6/2011 Remillard et al.
7,958,711 B1 * 6/2011 Sauerwein ..... A01D 57/20 56/181
7,971,418 B2 * 7/2011 Conrad ..... A01D 41/148 56/162
7,975,462 B1 * 7/2011 Figgins ..... A01D 41/14 56/181
8,006,469 B2 8/2011 Barnett
8,006,831 B1 * 8/2011 Mackin ..... B65G 21/02 198/812
8,015,784 B2 9/2011 Barnett et al.
8,020,363 B1 9/2011 Barnett et al.
8,020,648 B2 9/2011 Otto
8,056,311 B1 11/2011 Barnett
8,065,865 B1 * 11/2011 Dow ..... A01D 57/20 56/181
8,069,640 B2 12/2011 Barnett et al.
8,091,330 B2 1/2012 Lohrentz et al.
8,096,102 B2 1/2012 Smith
8,117,812 B2 2/2012 Patterson
8,161,719 B2 4/2012 Barnett et al.
8,176,716 B2 5/2012 Coers et al.
8,191,344 B2 6/2012 Sauerwein
8,205,421 B2 6/2012 Sauerwein et al.
8,205,422 B2 6/2012 Sauerwein et al.
8,225,589 B2 7/2012 Barnett
8,225,903 B2 7/2012 Dunn
8,240,114 B2 8/2012 Barnett
8,245,489 B2 8/2012 Talbot
8,281,561 B2 10/2012 Dow et al.
8,286,411 B2 10/2012 Barnett et al.
8,286,412 B2 10/2012 Kidd et al.
8,291,684 B2 10/2012 Remillard et al.
8,291,686 B1 * 10/2012 Cormier ..... A01D 61/002 56/181
8,307,620 B1 11/2012 Barnett et al.
8,322,520 B2 * 12/2012 Dow ..... A01D 61/002 198/837
8,333,057 B2 12/2012 Schroeder et al.
8,341,927 B2 1/2013 Barnett
8,341,929 B2 1/2013 Sauerwein et al.
8,387,351 B2 3/2013 Guyer
8,402,728 B2 3/2013 Kidd
8,408,567 B2 4/2013 Bergman et al.
8,434,290 B2 5/2013 Barnett et al.
8,468,789 B2 6/2013 Barnett et al.
8,479,483 B1 * 7/2013 Huseman ..... A01D 41/14 56/181
8,484,938 B2 7/2013 Cormier et al.
8,484,939 B1 * 7/2013 Cormier ..... A01D 43/06 56/158
8,511,050 B1 * 8/2013 Cormier ..... A01D 41/14 56/158
8,590,284 B2 11/2013 Rayfield
8,752,359 B2 * 6/2014 Cormier ..... A01D 43/06 56/156
9,271,443 B2 * 3/2016 Sethi ..... A01D 41/14
9,338,941 B2 * 5/2016 Herringshaw ..... A01D 34/40
9,635,810 B2 5/2017 Leys et al.
9,814,183 B2 * 11/2017 Allochis ..... A01D 34/18
10,285,331 B2 5/2019 Leys et al.
11,006,578 B2 5/2021 Leys et al.
2002/0129591 A1 * 9/2002 Patterson ..... A01D 57/20 56/158
2007/0193243 A1 * 8/2007 Schmidt ..... A01D 41/14 56/181
2007/0204584 A1 * 9/2007 Coers ..... A01D 41/14 56/15.8
2007/0204589 A1 * 9/2007 Coers ..... A01D 57/20 56/208
2008/0092508 A1 * 4/2008 Talbot ..... A01D 57/20 56/181
2008/0271426 A1 * 11/2008 Lohrentz ..... A01D 41/14 56/153
2008/0276590 A1 * 11/2008 Sauerwein ..... A01D 41/14 56/153
2008/0276591 A1 11/2008 Tippery et al.
2009/0007533 A1 * 1/2009 Lovett ..... A01D 61/002 56/14.5
2009/0266044 A1 * 10/2009 Coers ..... A01D 41/14 56/208
2009/0277146 A1 * 11/2009 Sauerwein ..... A01D 41/14 56/208
2009/0288383 A1 * 11/2009 Sauerwein ..... A01D 41/14 56/181
2009/0308042 A1 * 12/2009 Lovett ..... A01D 57/20 56/153
2010/0313540 A1 12/2010 Sauerwein
2011/0308221 A1 * 12/2011 Sauerwein ..... A01D 41/14 56/181
2012/0042617 A1 * 2/2012 Dow ..... A01D 61/002 56/14.5
2012/0043185 A1 2/2012 Dow et al.
2012/0233974 A1 * 9/2012 Cormier ..... A01D 61/002 56/181
2012/0251653 A1 10/2012 Mathy, Jr. et al.
2012/0260870 A1 10/2012 Wahl et al.
2013/0036860 A1 2/2013 Corniani
2013/0160417 A1 6/2013 Huseman et al.
2014/0001726 A1 1/2014 Statz
2014/0033940 A1 2/2014 Simpson et al.
2014/0059995 A1 3/2014 Cormier et al.
2014/0150601 A1 6/2014 McGrath
2014/0196427 A1 * 7/2014 Fuechtling ..... A01D 41/181 56/181
2016/0316620 A1 * 11/2016 Allochis ..... A01D 34/18
2020/0015418 A1 1/2020 Talbot et al.

FOREIGN PATENT DOCUMENTS

CA 1043577 12/1978
CA 2180627 1/1980
CA 1086508 9/1980

(56) References Cited

FOREIGN PATENT DOCUMENTS

| | | | |
|---|---|---|---|
| CA | 1087402 | | 10/1980 |
| CA | 1185438 | | 4/1985 |
| CA | 1197694 | | 12/1985 |
| CA | 1318135 | | 5/1993 |
| CA | 2100204 | | 1/1995 |
| CA | 2126909 | | 1/1995 |
| CA | 2138939 | | 6/1996 |
| CA | 2138939 | A1 | 6/1996 |
| CA | 2165735 | | 6/1997 |
| CA | 2180625 | | 1/1998 |
| CA | 2180626 | | 1/1998 |
| CA | 2211363 | | 1/1998 |
| CA | 2198672 | | 8/1998 |
| CA | 2226200 | | 11/1998 |
| CA | 2229152 | | 8/1999 |
| CA | 2245213 | | 2/2000 |
| CA | 2280681 | | 2/2000 |
| CA | 2184278 | | 8/2000 |
| CA | 2289164 | | 10/2000 |
| CA | 2289171 | | 10/2000 |
| CA | 2284432 | | 4/2001 |
| CA | 2284436 | | 4/2001 |
| CA | 2320379 | | 5/2001 |
| CA | 2311019 | | 8/2001 |
| CA | 2311019 | A1 | 8/2001 |
| CA | 2307176 | | 10/2001 |
| CA | 2320524 | | 3/2002 |
| CA | 2357825 | | 9/2002 |
| CA | 2380557 | | 10/2002 |
| CA | 2387898 | | 12/2002 |
| CA | 2358883 | | 4/2003 |
| CA | 2359598 | | 4/2003 |
| CA | 2370891 | | 4/2003 |
| CA | 2399234 | | 6/2003 |
| CA | 2389513 | | 12/2003 |
| CA | 2406416 | | 4/2004 |
| CA | 2406419 | | 4/2004 |
| CA | 2427755 | | 11/2004 |
| CA | 2461790 | | 11/2004 |
| CA | 2467595 | | 12/2004 |
| CA | 2434981 | | 1/2005 |
| CA | 2510883 | | 12/2005 |
| CA | 2513037 | | 2/2006 |
| CA | 2341283 | | 3/2006 |
| CA | 2494395 | | 6/2006 |
| CA | 2494034 | | 7/2006 |
| CA | 2505431 | | 9/2006 |
| CA | 2505458 | | 9/2006 |
| CA | 2531189 | | 9/2006 |
| CA | 2513605 | | 1/2007 |
| CA | 2513614 | | 1/2007 |
| CA | 2528731 | | 1/2007 |
| CA | 2743336 | | 1/2007 |
| CA | 2521187 | | 3/2007 |
| CA | 2522387 | | 4/2007 |
| CA | 2524151 | | 4/2007 |
| CA | 2525904 | | 5/2007 |
| CA | 2527797 | | 5/2007 |
| CA | 2534200 | | 6/2007 |
| CA | 2538020 | | 8/2007 |
| CA | 2554689 | | 1/2008 |
| CA | 2596403 | | 2/2008 |
| CA | 2559217 | | 3/2008 |
| CA | 2559353 | | 3/2008 |
| CA | 2561463 | | 3/2008 |
| CA | 2609744 | | 5/2008 |
| CA | 2627320 | | 9/2008 |
| CA | 2626486 | | 2/2009 |
| CA | 2639032 | | 3/2009 |
| CA | 2783567 | | 3/2009 |
| CA | 2587107 | | 7/2009 |
| CA | 2627053 | | 9/2009 |
| CA | 2722896 | | 11/2009 |
| CA | 2722896 | A1 | 11/2009 |
| CA | 2578907 | | 4/2010 |
| CA | 2671880 | | 4/2010 |
| CA | 2564777 | | 8/2010 |
| CA | 2564777 | C | 8/2010 |
| CA | 2695689 | | 9/2010 |
| CA | 2665580 | | 11/2010 |
| CA | 2665589 | | 11/2010 |
| CA | 2706704 | | 1/2011 |
| CA | 2706705 | | 1/2011 |
| CA | 2706706 | | 1/2011 |
| CA | 2706707 | | 1/2011 |
| CA | 2775891 | | 1/2011 |
| CA | 2783670 | | 1/2011 |
| CA | 2713636 | | 2/2011 |
| CA | 2596627 | | 4/2011 |
| CA | 2686017 | | 5/2011 |
| CA | 2721118 | | 5/2011 |
| CA | 2739632 | | 11/2011 |
| CA | 2708744 | | 12/2011 |
| CA | 2745105 | | 12/2011 |
| CA | 2538489 | | 1/2012 |
| CA | 2707624 | | 1/2012 |
| CA | 2709336 | | 1/2012 |
| CA | 2710676 | | 2/2012 |
| CA | 2734475 | | 5/2012 |
| CA | 2766611 | | 7/2012 |
| CA | 2744070 | | 12/2012 |
| CA | 2802894 | | 1/2013 |
| CA | 2796109 | | 5/2013 |
| CA | 2796120 | | 5/2013 |
| CA | 2796131 | | 5/2013 |
| CA | 2796134 | | 5/2013 |
| CA | 2796177 | | 5/2013 |
| CA | 2796165 | | 6/2013 |
| CA | 2802958 | | 7/2013 |
| CA | 2802963 | | 7/2013 |
| CA | 2802972 | | 7/2013 |
| CA | 2802975 | | 7/2013 |
| CA | 2803470 | | 7/2013 |
| CA | 2814924 | | 10/2013 |
| CA | 2815395 | | 10/2013 |
| CA | 2815408 | | 10/2013 |
| CA | 2815421 | | 10/2013 |
| CA | 2815427 | | 10/2013 |
| CA | 2789049 | | 12/2013 |
| CA | 2789049 | A1 | 12/2013 |
| EP | 1935226 | | 6/2008 |
| WO | 2012/166629 | | 12/2012 |

OTHER PUBLICATIONS

Notification issued by the Canadian Intellectual Property Office dated Dec. 23, 2016 regarding a Protest filed on Dec. 14, 2016 against corresponding Canadian Patent Application No. 2,803,762, 15 pages.

* cited by examiner

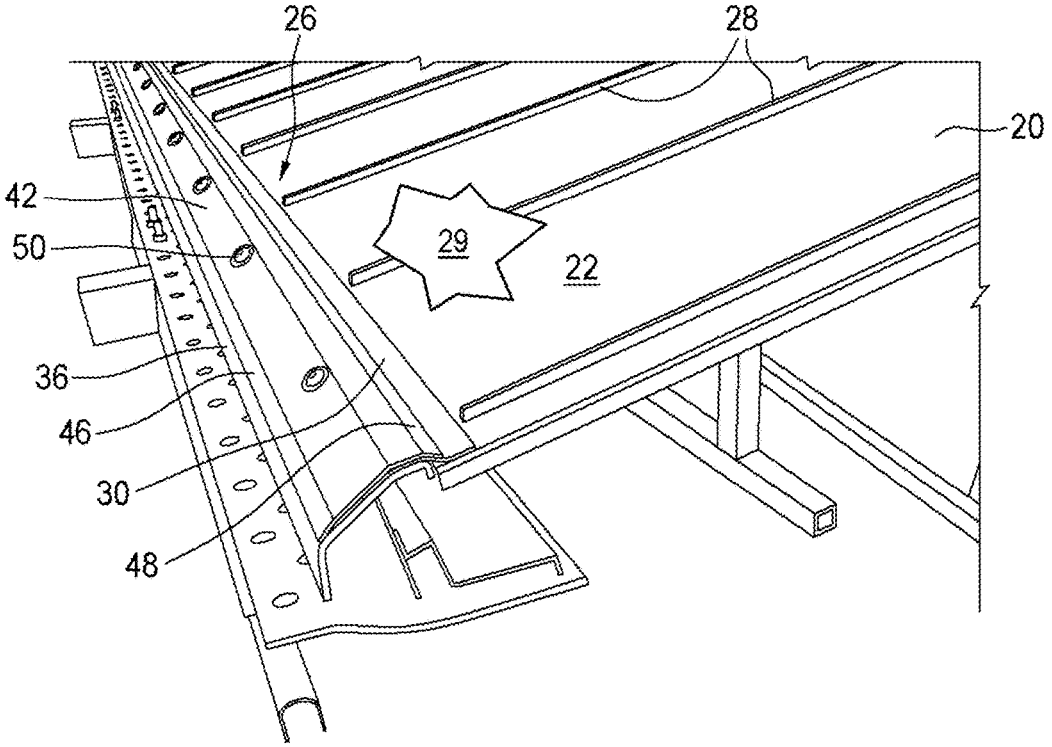
FIG. 2
AMENDED

DRAPER SEAL FOR CROP HEADER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is *a reissue of U.S. Pat. No. 10,694,675, originally issued on Jun. 30, 2020 from U.S. patent application Ser. No. 16/410,174 filed on May 13, 2019, which is* a continuation of U.S. patent application Ser. No. 15/453,161 filed on Mar. 8, 2017 (*now U.S. Pat. No. 10,285,331 issued on May 14, 2019*), which is a continuation of U.S. patent application Ser. No. 13/766,800 filed on Feb. 14, 2013 (now U.S. Pat. No. 9,635,810 issued on May 2, 2017), which claims priority to Canadian Patent Application Serial No. 2,799,093 filed on Dec. 18, 2012, the entire contents of which are hereby incorporated by reference herein.

FIELD OF THE INVENTION

The invention relates to agricultural implements for harvesting crops, and more particularly to harvesting headers comprising a draper deck.

BACKGROUND OF THE INVENTION

It is known in the field of crop harvesting equipment to employ harvesting headers to cut crops for various purposes, such as feeding a combine harvester or swathing crop material. Such harvesting headers may comprise a cutter bar assembly for cutting the crop material, and a draper deck assembly for transporting the cut crop material to a desired location (e.g. the intake for a combine harvester). The draper deck assembly normally comprises two spaced-apart rollers for receiving a continuous loop of draper fabric or canvas, with a support plate fixed under the upper run of draper canvas and disposed between the rollers. In operation, the implement is driven into the standing crop, with the cutting edge assembly at the leading edge of the implement. After the cutting edge assembly cuts the crop material, the crop material falls and/or is moved rearwardly onto the generally horizontal draper deck assembly and then transported perpendicular to the direction of travel by the draper deck assembly and deposited either on the ground or at an intake for subsequent processing. Such an arrangement has many known benefits and has achieved wide acceptance and use.

However, it has been recognized that traditional cutter/draper arrangements as described above may generate undesirable results. In the traditional arrangement, the cutter bar assembly is slightly spaced from the draper deck assembly, and the gap between the two assemblies can receive chaff, mud, plant juices and other materials that can accumulate on surfaces adjacent the gap and ultimately interfere with optimal operation of the implement.

Some attempts have been made to address this problem by sealing the gap between the cutter bar assembly and the draper deck assembly. In one such attempt, for example, a John Deere Model 800 header was provided with a sealing plate mounted on the cutter bar assembly and extending rearwardly over the forward edge of the draper deck assembly. However, it has been recognized that the draper canvas can become pinched between the sealing plate and the support plate underlying the draper canvas, resulting in wear, and it has been noted that accumulation of undesirable materials was still evident.

In response to this identified deficiency, an alternative solution was proposed in Canadian Patent No. 2,138,939 to MacDon Industries Ltd. In this alternative solution, the support plate and rollers were shifted rearwardly of the leading edge of the draper canvas, resulting in a cantilevered edge of the draper canvas that could be in contact with an overhanging sealing plate without binding against the support plate in operation. However, there is an obvious lack of support for the forward edge of the draper canvas, with the risk that undesirable materials can still foul the moving parts of the implement.

What is needed, therefore, is a solution that provides a reliable seal and does not detract from the integrity of the draper canvas functionality.

SUMMARY OF THE INVENTION

The present invention therefore seeks to provide a draper seal that is composed of a flexible material in order to avoid binding of the draper canvas, while preventing fouling of implement components from undesirable material accumulation.

According to a first aspect of the present invention there is provided a draper seal for a harvesting header, where the header comprises a frame on which is mounted a forwardly disposed cutter bar assembly and a rearwardly disposed draper deck assembly. The draper deck assembly comprises two spaced-apart rollers on which a continuous loop of draper canvas is mounted, and a support plate disposed underneath an upper run of the draper canvas and between the rollers. The draper seal comprises a flexible strip that runs parallel to the cutter bar assembly and perpendicular to the direction of travel, the flexible strip having a forward edge and a rearward edge. A bracket secures the forward edge of the flexible strip to an upper surface of the cutter bar assembly, which bracket also extends rearwardly to bias the rearward edge of the flexible strip into engagement with an upper surface of the draper canvas, thereby creating a seal between the cutter bar assembly and the draper deck assembly.

According to a second aspect of the present invention, there is a provided a harvesting header comprising a frame, a forwardly disposed cutter bar assembly mounted on the frame, a rearwardly disposed draper deck assembly mounted on the frame, and a draper seal mounted on the cutter bar assembly. The draper deck assembly comprises two spaced-apart rollers on which a continuous loop of draper canvas is mounted, and a support plate disposed underneath an upper run of the draper canvas and between the rollers. The draper seal comprises a flexible strip that runs parallel to the cutter bar assembly and perpendicular to the direction of travel, the flexible strip having a forward edge and a rearward edge. A bracket secures the forward edge of the flexible strip to an upper surface of the cutter bar assembly, which bracket also extends rearwardly to bias the rearward edge of the flexible strip into engagement with an upper surface of the draper canvas, thereby creating a seal between the cutter bar assembly and the draper deck assembly.

In exemplary embodiments of the present invention, the flexible strip and the draper canvas are both composed of a fabric substrate that has been coated with rubber and then vulcanized. The bracket is preferably an elongate metal bracket that extends the length of the cutter bar assembly and secures the forward edge of the flexible strip with a plurality of bolts. The bracket preferably comprises a forward portion that is configured to engage and be secured to the cutter bar assembly, and a rearward portion that is angled downwardly to press the rearward edge of the flexible strip against the upper run of the draper canvas. The draper deck assembly may be comprised of a single draper canvas or two separate draper canvases moving cut crop material in a single direction, or paired draper canvasses each moving cut crop material toward a centrally disposed draper assembly that feeds the received crop material to a further processing unit such as a combine harvester.

A detailed description of an exemplary embodiment of the present invention is given in the following. It is to be understood, however, that the invention is not to be construed as being limited to this embodiment.

BRIEF DESCRIPTION OF THE DRAWINGS

In the accompanying drawings, which illustrate an exemplary embodiment of the present invention:

FIG. 2 is a perspective view of a partial cutter bar assembly and draper deck assembly with a draper seal according to the present invention; and FIG. 3 is a perspective view of an adjacent cutter bar assembly and draper deck assembly with a draper seal according to the present invention.

Figure 1:
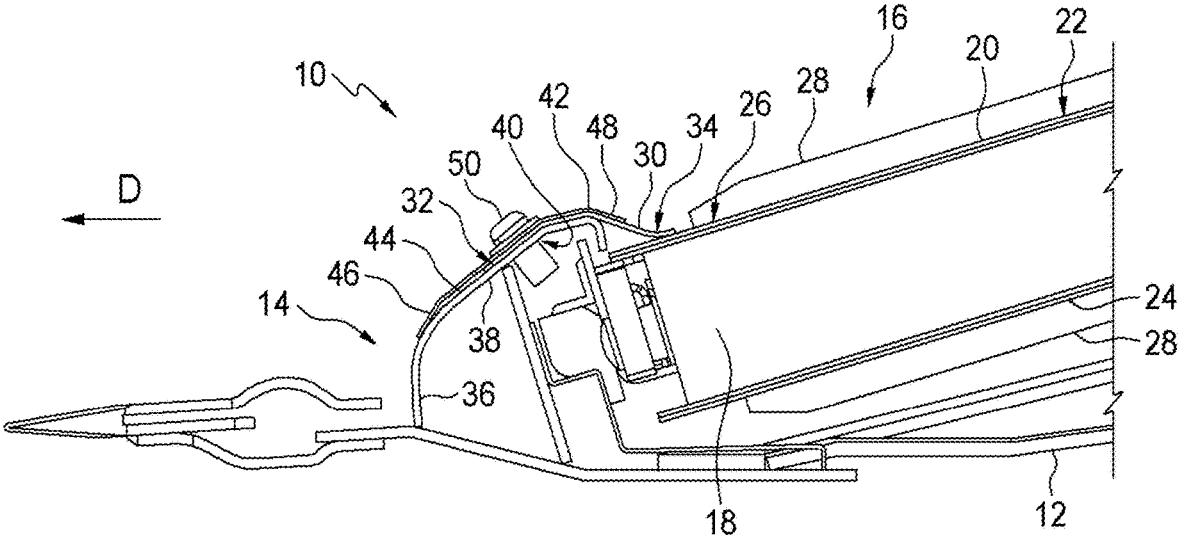
FIG. 1 is a simplified, partially cutaway elevation view of a draper seal according to the present invention.

An exemplary embodiment of the present invention will now be described with reference to the accompanying drawings.

DETAILED DESCRIPTION OF EXEMPLARY EMBODIMENT

Only those parts of the header as are necessary for description of the draper seal are shown in the accompanying drawings and discussed herein, as the remaining parts and functions of the header are conventional and are well known to those skilled in the art.

Turning to FIG. 1, a header 10 according to the present invention is illustrated. The header comprises a frame 12 on which a cutter bar assembly 14 and a draper deck assembly 16 are mounted in a conventional manner.

The draper deck assembly 16 comprises a first roller 18 and a second roller (not shown) spaced apart from each other in a direction transverse to the direction of travel, which direction of travel is indicated by the letter D in FIG. 1. The rollers are mounted and powered in a conventional manner that will accordingly not be discussed further herein. The rollers provide support for a draper canvas 20, which is a continuous loop of material commonly formed by taking a fabric and coating it with rubber, which is then vulcanized and formed as desired for the particular application. The draper canvas 20, when installed on the rollers, has an upper run 22 passing above the rollers and a lower run 24 passing beneath the rollers, the upper run 22 presenting an upper surface 26 for receipt of cut crop materials during operation. An outer surface of the draper canvas 20 is provided with transverse slats 28 which run parallel to the direction of travel D and are commonly employed to aid in moving cut crop material along the draper deck assembly 16. The draper canvas 20 and slats 28 can best be seen in FIGS. 2 and 3. A support plate [(not shown)] *29* is commonly provided between the rollers and immediately beneath the upper run 22 of the draper canvas 20 to provide support to the draper canvas 20. It is to be noted that the draper deck assembly 16 may be comprised of a single draper canvas 20 or two separate draper canvases moving cut crop material in a single direction, or paired draper canvasses each moving cut crop material toward a centrally disposed draper assembly that feeds the received crop material to a further processing unit such as a combine harvester; this will depend on the specific application and is not intended to limit the scope of the present invention.

The cutter bar assembly 14 comprises a beam 36, which beam 36 comprises an upper portion 38 that is disposed forward of and above the upper surface 26 of the draper canvas 20.

Referring now to FIGS. 1 to 3, a draper seal according to the present invention comprises a bracket 42 and a flexible strip 30. The bracket 42 as illustrated is an elongate metal member that extends the length of the cutter bar assembly 14. The bracket 42 comprises a forward portion 46 and a rearward portion 48. The forward portion 46 of the bracket 42 is secured to an upper surface 44 of the upper portion 38 of the beam 36 by means of a series of bolts 50 that pass through aligned holes 40 in the bracket 42 and beam 36. As can best be seen in FIG. 1, the rearward portion 48 of the bracket 42 extends rearwardly of the upper portion 38 of the beam 36 and angles downwardly toward the draper canvas 20.

The flexible strip 30 runs the length of the bracket 42 and comprises a forward edge 32 and a rearward edge 34. The forward edge 32, as can best be seen in FIG. 1, is secured between the bracket 42 and the upper portion 38 of the beam 36 by means of the bolts 50. The rearward edge 34 extends rearwardly of the cutter bar assembly 14 and the bracket 42. The rearward portion 48 of the bracket 42 is angled downwardly toward the draper canvas 20, which has the effect of biasing the rearward edge 34 of the flexible strip 30 downwardly and into contact with the upper surface 26 of the draper canvas 20. The flexible strip 30 is preferably composed of a material similar to the draper canvas 20, namely a fabric that has been coated with rubber and vulcanized, which material has sufficient flexibility to contact the upper surface 26 of the draper canvas 20 without causing binding of the draper canvas 20 against the support plate.

The bracket 42 is shown as having a downwardly angled rearward portion 48, but it is also within the scope of the present invention to have a bracket that is in a single plane and is mounted to the cutter bar assembly in such a way that it rests in a plane that is angled toward the draper canvas 20 to bias the flexible strip 30 against the draper canvas 20.

As can be readily seen, then, there are numerous advantages provided by the present invention. The gap that would otherwise be present between the cutter bar assembly and the draper deck assembly is closed, thus avoiding accumulation of undesired materials. Also, the draper seal comprises a flexible strip that can press against the upper surface of the draper canvas in operation without causing binding and wear of the draper canvas, and it is not necessary to leave any forward part of the draper canvas unsupported. Finally, it is to be noted that the present invention provides a solution that involves a simple and rugged design appropriate to the anticipated operating conditions.

The foregoing is considered as illustrative only of the principles of the invention. Thus, while certain aspects and embodiments of the invention have been described, these have been presented by way of example only and are not intended to limit the scope of the invention. The scope of the claims should not be limited by the exemplary embodiments set forth in the foregoing, but should be given the broadest interpretation consistent with the specification as a whole.

The invention claimed is:

1. A harvesting header comprising a frame[.] *;* a forwardly disposed cutter bar assembly mounted on the frame, *the cutter bar assembly operable to cut crop to generate cut crop material*;

a rearwardly disposed draper deck assembly mounted on the frame and generally disposed rearwardly of the cutter bar assembly, the draper deck assembly comprising two spaced-apart rollers on which a continuous loop of draper canvas is mounted, said draper canvas having an upper moving conveyor surface being operable to move in a direction of movement that is transverse to a direction of travel of the harvesting header, said upper conveyor surface being operable to receive and move said cut crop material in said transverse direction of movement;

and a draper seal apparatus comprising:

a flexible strip oriented substantially parallel to the cutter bar assembly and substantially perpendicular to said direction of travel of the harvesting header, and substantially parallel to the direction of movement of the conveyor surface, wherein the flexible strip has a forward edge and a rearward edge; and a bracket mounted on the cutter bar assembly, the bracket extending substantially parallel to the direction of movement of the conveyor surface and said bracket being configured to secure the forward edge of the flexible strip adjacent an upper surface of the cutter bar assembly;

wherein the bracket extends rearwardly and is operable such that the rearward edge of the flexible strip is biased by the bracket into substantially continuous engagement with said upper surface of the draper canvas to provide a seal between the cutter bar assembly and the draper canvas.

2. The harvesting header of claim 1 wherein the flexible strip and the draper canvas are both composed of a fabric substrate coated with vulcanized rubber.

3. The harvesting header of claim 1 wherein the bracket is an elongate metal bracket that extends the length of the cutter bar assembly.

4. The harvesting header of claim 1 wherein the bracket secures the forward edge of the flexible strip with a plurality of bolts.

5. The harvesting header of claim 1 wherein the bracket comprises a forward portion that is configured to engage and be secured to the cutter bar assembly, and a rearward portion that is angled downwardly to bias the rearward edge of the flexible strip into engagement with the upper surface of the draper canvas.

6. The harvesting header of claim 1 wherein the draper deck assembly comprises a single draper canvas or two separate draper canvases moving *said* cut crop material in a single direction.

7. The harvesting header of claim 1 wherein the draper deck assembly comprises paired draper canvasses each moving *said* cut crop material transversely in opposite directions and toward a centrally disposed draper assembly that is operable to feed the received cut crop material to a further processing unit.

8. The harvesting header of claim 1 wherein the draper deck assembly further comprises a support plate disposed beneath an upper run of the draper canvas and between the rollers, the bracket biasing the rearward edge of the flexible strip such that the upper run of the draper canvas is loosely received between the rearward edge of the flexible strip and the support plate.

9. The harvesting header of claim 8 wherein the bracket extends for substantially the entire length of the cutter bar assembly and the flexible strip extends for substantially the entire length of the bracket.

*10. The harvesting header of claim 1 wherein the bracket is operable such that the rearward edge of the flexible strip is biased by the bracket into substantially continuous contact with said upper surface of the draper canvas to provide a seal between the cutter bar assembly and the draper canvas.*

*11. A harvesting header comprising:*

*a forwardly disposed cutter bar assembly operable to cut crop to generate cut crop material;*

*a rearwardly disposed draper deck assembly, the draper deck assembly comprising two comprising two spaced-apart rollers on which a loop of draper canvas is mounted, said draper canvas having an upper moving conveyor surface being operable to move in a direction of movement that is transverse to a direction of travel of the harvesting header, said upper conveyor surface being operable to receive and move said cut crop material in said transverse direction of movement; and*

*a draper seal apparatus comprising:*

*a flexible strip oriented substantially parallel to the cutter bar assembly and substantially perpendicular to said direction of travel of the harvesting header, wherein the flexible strip has a forward edge and a rearward edge; and*

*a bracket;*

*wherein the bracket extends rearwardly and is operable such that the rearward edge of the flexible strip is biased by the bracket into substantially continuous engagement with said upper surface of the draper canvas.*

*12. The harvesting header of claim 11 further comprising a frame, wherein the cutter bar assembly and the draper deck assembly are mounted on the frame.*

*13. The harvesting header of claim 11 further comprising a frame, wherein the cutter bar assembly and the draper deck assembly are interconnected with the frame.*

*14. The harvesting header of claim 11 wherein the bracket is mounted on the cutter bar assembly.*

*15. The harvesting header of claim 11 wherein the bracket secures the forward edge of the flexible strip to the cutter bar assembly.*

*16. The harvesting header of claim 11 wherein the bracket secures the forward edge of the flexible strip to a structure forward of the draper deck assembly.*

*17. The harvesting header of claim 11 wherein the bracket secures the forward edge of the flexible strip to an upper surface of the cutter bar assembly.*

*18. The harvesting header of claim 11 wherein the flexible strip and the draper canvas are both composed of a fabric substrate coated with vulcanized rubber.*

*19. The harvesting header of claim 11 wherein the bracket is an elongate metal bracket that extends the length of the cutter bar assembly.*

*20. The harvesting header of claim 11 wherein the bracket comprises a forward portion that is configured to engage and be secured to the cutter bar assembly, and a rearward portion that is angled downwardly to bias the rearward edge of the flexible strip into engagement with the upper surface of the draper canvas.*

*21. The harvesting header of claim 11 wherein the bracket extends for substantially the entire length of the cutter bar assembly and the flexible strip extends for substantially the entire length of the bracket.*

*22. The harvesting header of claim 11 wherein the bracket is operable such that the rearward edge of the flexible strip is biased by the bracket into substantially continuous engagement with said upper surface of the draper canvas to provide a seal between the cutter bar assembly and the draper canvas.*

*23. The harvesting header of claim 11 wherein the rearwardly disposed draper deck assembly is generally disposed rearwardly of the cutter bar assembly.*

*24. The harvesting header of claim 11 wherein the loop of draper canvas is a continuous loop of draper canvas.*

*25. The harvesting header of claim 11 wherein the flexible strip is oriented substantially parallel to the direction of movement of the conveyor surface.*

*26. The harvesting header of claim 11 wherein the bracket extends substantially parallel to the direction of movement of the conveyor surface.*

*27. The harvesting header of claim 11 wherein the bracket is operable such that the rearward edge of the flexible strip is biased by the bracket into substantially continuous contact with said upper surface of the draper canvas.*

* * * * *